United States Patent [19]

Bale

[11] 4,051,595
[45] Oct. 4, 1977

[54] METHODS FOR SETTING INSULATORS AND PRESSING END TURNS

[75] Inventor: Richard W. Bale, Fennville, Mich.

[73] Assignee: General Electric Company, Fort Wayne, Ind.

[21] Appl. No.: 740,830

[22] Filed: Nov. 11, 1976

Related U.S. Application Data

[62] Division of Ser. No. 593,491, July 7, 1975, Pat. No. 4,003,116.

[51] Int. Cl.² .............................................. H02K 15/06
[52] U.S. Cl. ....................................... 29/596; 29/606; 29/734; 29/736
[58] Field of Search ............. 29/205 R, 205 D, 205 E, 29/596, 598, 606, 732, 734, 736; 310/214; 242/1.1 E

[56] References Cited

U.S. PATENT DOCUMENTS

| | | | |
|---|---|---|---|
| 2,506,173 | 5/1950 | Polard | 29/205 D |
| 2,873,514 | 2/1959 | Mills | 29/205 D |
| 2,980,157 | 4/1961 | Rediger | 29/596 |
| 3,593,405 | 7/1971 | Hahn | 29/205 D |
| 3,762,041 | 10/1973 | Bair | 29/596 |
| 3,841,133 | 10/1974 | Rice, Jr. | 29/596 X |

Primary Examiner—Carl E. Hall
Attorney, Agent, or Firm—Ralph E. Krisher, Jr.

[57] ABSTRACT

One disclosed method includes positioning a stator assembly at a first station in a desired relationship to a wedge setting device and winding shaping mechanism; holding the stator assembly in the desired relative position (e.g. by clamping means); substantially simultaneously setting the wedges and shaping winding end turns along at least one end or side of the stator assembly; and then removing the stator assembly from the first station. The wedge setting device includes a number of outwardly movable wedge setting blades; and the winding shaping mechanism includes one or more winding pressing surfaces that are driven by camming elements which are actuated during movement of the blades. In specific apparatus, the camming elements take the form of cam surfaces which are carried by a plurality of the blades; and when a single driving member actuates the blades, the blades themselves power (through the cam surfaces) the winding shaping mechanism.

1 Claim, 7 Drawing Figures

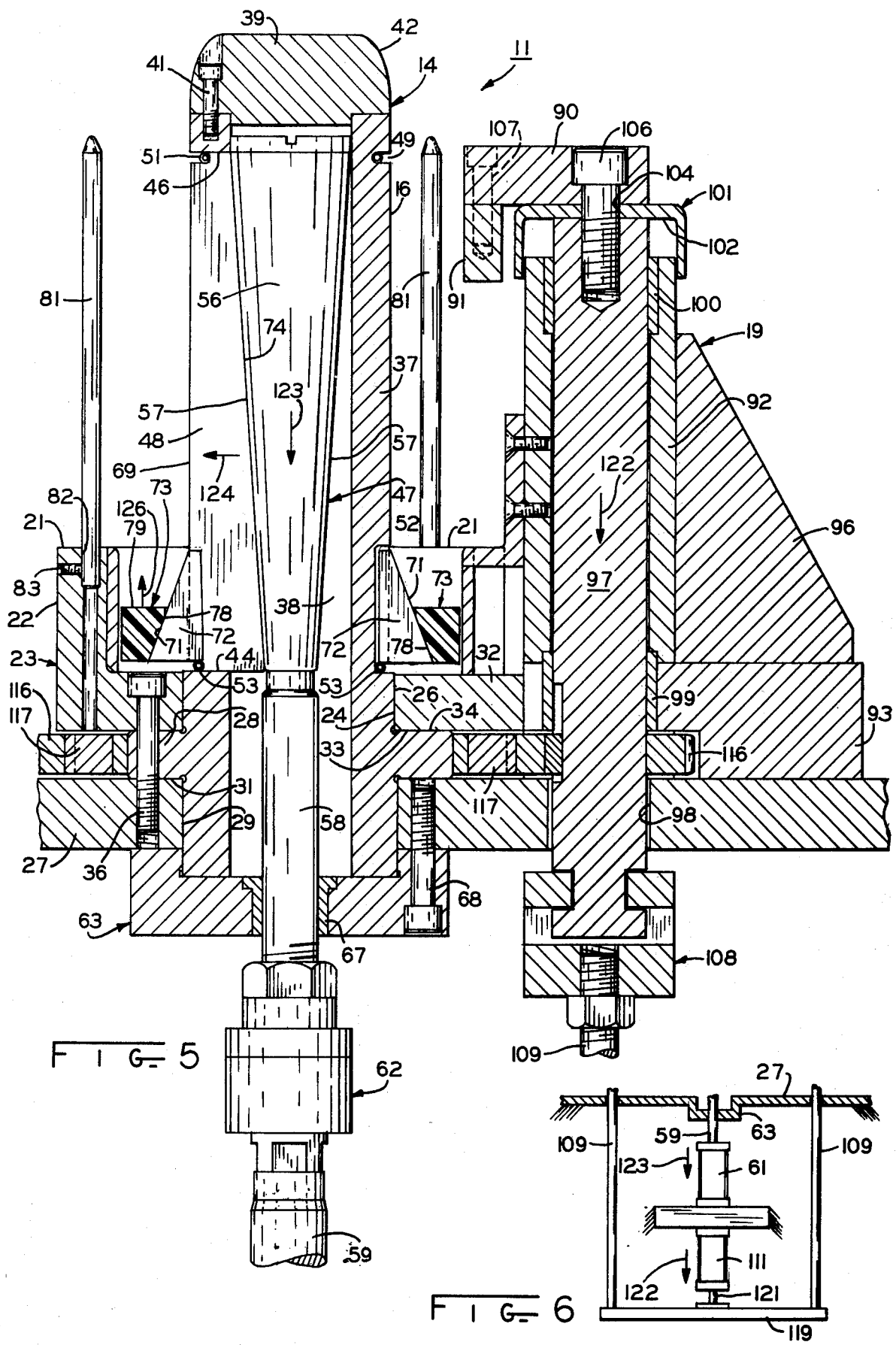

4,051,595

METHODS FOR SETTING INSULATORS AND PRESSING END TURNS

CROSS REFERENCE TO RELATED APPLICATION

This application is a division of my co-pending application Ser. No. 593,491 which was filed on July 7, 1975; and the entire disclosure of said application is incorporated herein by reference. That application subsequently issued on Jan. 18, 1977 as U.S. Pat. No. 4,003,116.

BACKGROUND OF THE INVENTION

The present invention relates to apparatus for setting wedges and shaping winding end turn portions that form part of a dynamoelectric machine stator assembly.

In the past, one practice has been to place a stator assembly (comprising a stator core, with windings and wedges disposed in slots thereof) at a first work station; and press wedges and winding side turn portions into slots of the core during a "wedge setting" operation. Then the stator assembly has been moved from wedge setting apparatus at the first station to a second station, and there placed on other apparatus. Thereafter, the winding end turn portions have been shaped or "pressed" to a final desired shape or configuration.

This approach, however, has been somewhat costly in practice. For example, it has been necessary to have two separate machines, one for setting wedges and another for shaping the winding end turns. Also, it has been necessary for an operator to perform a number of time consuming work operations such as placing a stator assembly on a first machine, performing a first work operation, removing the stator assembly from the first machine, placing the stator assembly on a second winding shaping machine, performing a shaping operation, and then removing the stator assembly from the second machine.

After removal from the second machine, the stator assemblies normally have been prebaked, washed, varnish treated, final baked, inspected, and then packed for shipment.

At the previously known wedge setting stations referred to above, the stator assembly has been placed on apparatus having a number of wedge setting blades aligned with, and slightly projecting into, the slots of the stator core. The wedge setting blades then have been moved by a cam actuator outwardly along the slots so as to "set" the wedges, and ensure that the wedges and winding are pressed deeper into slots and away from the bore of the core.

It should now be understood that it would be quite desirable to provide economical and improved methods so that simultaneously setting of wedges and shaping of winding end turns may be accomplished at a single station and, preferably, with one piece of equipment or apparatus. It also would be quite desirable to reduce the time required to accomplish the various manufacturing steps outlined hereinabove. Moreover, it would be desirable to reduce the number of different or sequential steps that must be performed during the wedge setting and end turn pressing operations.

SUMMARY OF THE INVENTION

It is therefore an object of the present invention to provide improved methods for setting wedges and shaping windings.

A further object is to provide an improved method so as to quickly and easily provide different winding end turn configurations such as, e.g., end turn heights.

In carrying out the invention in preferred forms thereof, I provide new and improved methods for setting wedges and shaping windings. It is preferable to position a stator assembly at a first station in a desired relationship to wedge setting means and winding shaping means; hold the stator assembly in the desired relative position (e.g. by clamping means); substantially simultaneously set the wedges and shape winding end turns along at least one end or side of the stator assembly; and then remove the stator assembly from the first station.

In accordance with another aspect of the invention, new and improved apparatus that provides one means of carrying out the invention includes wedge setting means and, interconnected therewith, winding shaping means.

In an illustrated form, the wedge setting means includes a number of outwardly movable wedge setting blades; and the winding shaping means includes one or more winding pressing surfaces that are driven by camming means which are actuated during movement of the blades. In specific apparatus illustrated herein, the camming means take the form of cam surfaces which are carried by a plurality of the blades; and when a single driving member actuates the blades, the blades themselves power (through the cam surfaces) the winding shaping means.

BRIEF DESCRIPTION OF THE DRAWINGS

The subject matter which I regard as my invention is particularly pointed out and distinctly claimed in the concluding portion of the specification. The invention itself, however, taken with further objects and advantages thereof, may be best understood by reference to the following description taken in conjunction with the accompanying drawings in which:

FIG. 5 is a partial sectional view taken substantially on the plane of the lines 5—5 in FIG. 1 with parts removed and rotated for a clearer illustration;

FIG. 6 is a schematic representation of the hydraulic drive system for the apparatus of FIG. 1.

DESCRIPTION OF THE PREFERRED EMBODIMENT

Figures 1, 2:
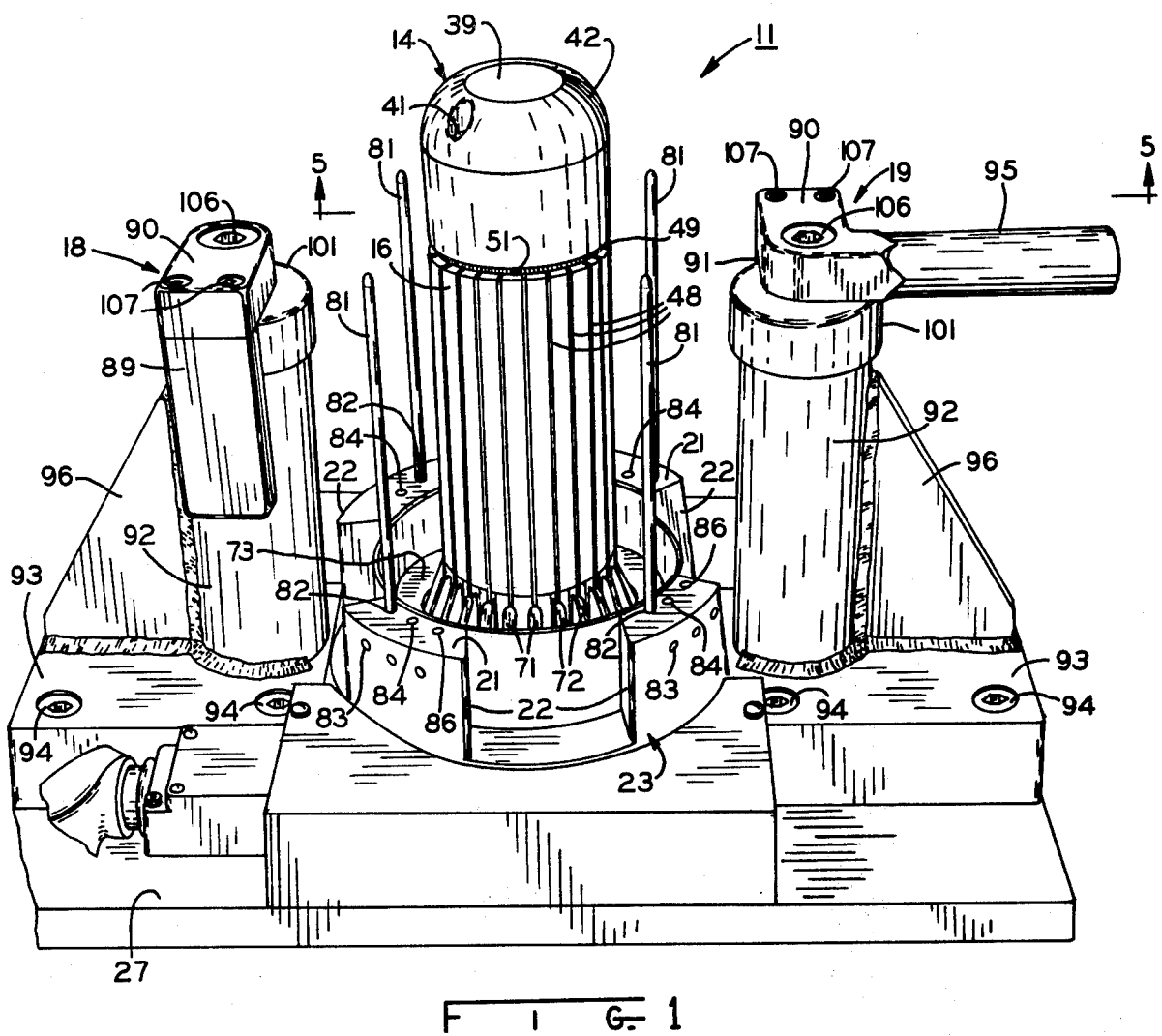
FIG. 1 is a front perspective view of apparatus that may be used to practice the invention in one form thereof.
FIG. 2 is a side view of a stator assembly showing different configurations of the winding end turns.
Figure 3:
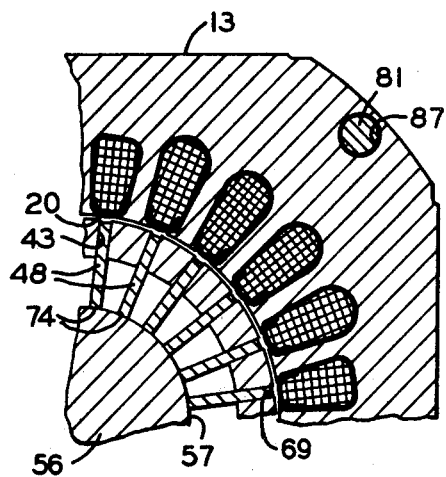
FIG. 3 is a partial sectional view of parts of the apparatus of FIG. 1, with the stator assembly of FIG. 2 positioned thereon, the wedge setting blades being in a first position relative to the stator core slots.
Figure 4:
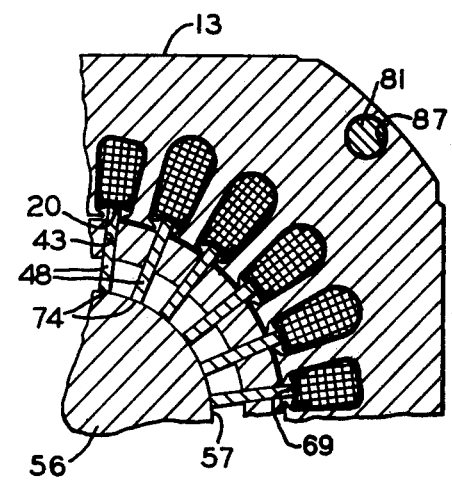
FIG. 4 is a view similar to FIG. 3, but wherein the wedge setting blades are in another position relative to the stator slots, and wherein wedges and winding side turn portions have been forced deeper into the core slots and further away from the stator core bore.

Referring now to the drawings in more detail; FIG. 1 illustrates the general construction of one form of apparatus 11 that is useful for setting wedges 20 and shaping winding end turns 12 of stator assembly 13 (as seen in FIGS. 2-4). A supporting frame, controls, hydraulic power units, and related piping and circuitry are removed from apparatus 11 in FIG. 1 for clarity of illustration. The apparatus 11 includes means for simultaneously setting wedges and shaping winding end turns 12 of the stator assembly 13.

As best shown in FIG. 1, the apparatus 11 includes a first station which is defined by wedge setting means and shaping means. This particular means is illustrated as including a central support column 14 having an outer surface 16 of a somewhat lesser diameter than that of the bore 15 of a stator core 17 (as seen in FIG. 2). The support column 14 and its outer surface acts as a stator position alignment structure, and is usable for locating stator assembly 13 in a desired relative position with respect to clamping means 18 and 19, and stator support surfaces 21.

As is clearly illustrated in FIG. 5, bearing surfaces 21 are carried by a bearing structure 23 having a cup shape and a bottom plate portion 32. The bottom plate portion 32 has a centrally located bore 24 and four equally spaced bearing legs 22. These legs 22 may (if desired) be perpendicular to the bottom plate portion 32, (best seen in FIG. 1), and the top surfaces 21 of the bearing legs 22 thus defining a bearing plane. The plane of the top bearing surfaces 21 is generally perpendicular to the longitudinal axis of support column 14.

Support column 14 is supported by a base plate 27. Located a distance from the bottom of the support column 14 is an annular rim 28. The portion of the support column 14, between the rim 28 and the bottom of the column, slip fits downwardly (as viewed in FIG. 5) through an annular aperture 29 in base plate 27, and a portion of the bottom of support column 14 protrudes beyond the bottom face of base plate 27 with the bottom face 31 of the rim 28 bearing on base plate 27.

The bearing structure 23 is assembled on support column 14 so that bore 24 slips on a portion 26 of the support column 14, with the bottom face 33 of the bottom plate portion 32 bearing on the top face 34 of rim 28. The bearing structure 23 and support column 14 are securely assembled to the base plate 27 through the use of any well-known means such as bolts 36.

Support column 14 has a cylindrical wall 37 that establishes an interior chamber 38 and an outer cylindrical surface 16. A member 39, with an outside diameter the same as cylindrical wall 37, seals the top of the cylindrical wall 37. The member 39 is secured to the cylindrical wall 37 by any well-known means such as bolts 41. A cap member 39 has an inwardly curving top portion 42 for aiding in the placing of a stator assembly on the support column 14.

The cylindrical wall 37 has a plurality of vertical slots 43 which extend from lower extremities 44 to upper extremities 46, all as best shown in FIG. 5. If the stator assembly to be processed has 36 slots, and wedges are to be set in each of the 36 slots, there will be at least 36 wedge setting means 48.

The cylindrical wall 37 has an annular notch 49 that captures an annular tension spring 51 even when the spring is expanded radially outwardly. Near the bottom of the cylindrical wall 37 another annular notch 52 is provided. This notch 52 retains a spring 53 which is similar to spring 51. The springs 51 and 53 serve a function that is described in more detail hereinbelow.

An actuating member 47, disposed within the chamber 38, includes a conical in shape portion 56 which thereby establishes a conical in shape surface 57. A rod portion 58 of the member 47 has a threaded end which is connected to a piston rod 59 of an hydraulic cylinder 61 (shown in FIG. 6) through a coupling 62.

The rod portion 58 is held in alignment with the column 14 by means of a cap member 63 which is fastened to the base plate by suitable means (such as bolts 68). A cap member 63 traps a bushing 67 that concentrically locates and aligns the rod portion 58 of the actuating member 47.

Wedge setting blades 48 have at least portions thereof disposed in chamber 38 and are radially movable in slots 43. Each blade 48 has a wedge setting vertical surface 69 along its radially outward periphery. The blades 48 each also carry a cam surface 71 which may be unitary therewith or part of a separable member as shown. In FIG. 5, each surface 71 is established by a shoe member 72 that is assembled with each blade 48, and each blade 48 has another cam surface 74 along the radially inner portion thereof. The taper of the cam surfaces 74 correspond to the taper of cam surface 57 of actuating member 47. Then, when rod 58 is urged downwardly (as viewed in FIG. 5), blades 48 are driven outwardly relative to column 14.

Wedge setting blades 48 have recessed areas 76 and 77 located at the top and bottom portions thereof, respectively. These recessed areas 76 and 77 also trap tension springs 51 and 53 respectively; and the springs 51 and 53 bias blades 48 inwardly into working engagement with the cam surface 57.

A winding end turn shaping means is provided in the form of an annular member 73. The member 73 has an inner, conical in shape, cam surface 78 that is tapered to be complimentary with the taper of the conical in shape cam surfaces 78. A winding pressing surface 79 is also provided on member 73. As blades 48 are urged outwardly by cam surface 57, shoe members 72 also move radially outwardly. Due to such movement, cam surfaces 71 and 78 interact to cause movement of member 73 in an upward direction, as viewed in FIG. 5.

Figure 7:
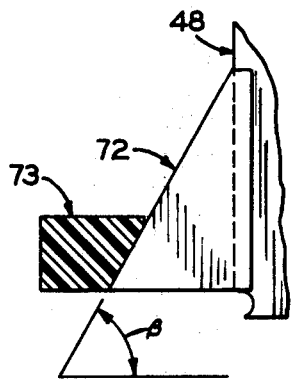
FIG. 7 is a view showing angular interrelationship of a shoe member and shaping means utilized on apparatus of FIG. 1.

It will be understood that different shoes 72 may be used that have tapers other than those shown for cam surfaces 71, and that different members 73 may be used so that the vertical displacement of member 73 (per unit of radial displacement of blade 48) may be varied. In other words, the amount of vertical movement of member 73 (per unit of radial movement of blade 48 and therefore shoe member 72) may be preselectively changed by selecting different shoe members 72, and different members 73 that have cam surface tapers different from that shown in FIG. 5. This can be better understood by referring to FIG. 7 where I have shown a shoe member 72, a portion of member 73, and an angle $\beta$. The angle $\beta$ is defined as the angle of inclination (with respect to the horizontal) of a line along the camming interface between member 73 and a shoe 72. This angle $\beta$ is an indication of the "taper" of shoes 72 and member 73; and as angle $\beta$ increases the taper is increased. Moreover, for a given increment of outward (i.e., radial) movement of shoe 72, member 73 will move upwardly a distance equal to the tangent of the angle $\beta$ times such given increment.

With reference now again to FIG. 1, stator alignment pins 81 are mounted in holes 82 in each of the four bearing legs 22. The pins 81 are secured in said holes 82 by set screws 83. Alignment pins 81 can be adjustably relocated in holes 84 or 86. As best seen in FIGS. 3-4, stator assembly 13 is placed over column 14 with alignment pins 81 in bolt holes 87 of the stator assembly 13.

This ensures that the wedge setting blades 48 will be in alignment with slots 88 of the stator assembly.

As seen in FIG. 1, the two clamping means 18 and 19 have clamping blocks 89 and 91 which are movable to clamp down on face 112 of the stator assembly and hold it in a desired position relative to column 14 and blades 48.

Clamping means 18 and 19 are substantially identical in construction, except that pivot arm 90 of clamping means 19 includes a grip or handle 95. Since clamping means 18 and 19 are generally the same, the following detailed description of clamping means 19 will also apply to clamping means 18, as will be understood.

FIG. 5 includes an illustration of clamping means 19, gear 116, and a portion of a gear 116 for clamping means 18. The clamping means 19 includes a vertical cylindrical housing 92 that is attached to mounting block 93 by a suitable manner such as welding; and the mounting block 93 is attached by means such as bolts 94 (as seen in FIG. 1) to the base plate 27. Cylindrical housing 92 extends vertically a sufficient distance above plane 21 to provide adequate clearance for a maximum height stator stack that is expected to be encountered. Reinforcing member 96 is attached to the cylindrical housing 92 and the mounting block 93 to maintain a desired rigidity of parts.

A shaft 97 is carried in cylindrical housing 92, and extends from below plate 27 through an aperture 98 (in base plate 27) and along cylindrical housing 92. The shaft 97 extends above the top of cylindrical housing 92 so as to provide a clearance between the top of shaft 97 and the top of cylindrical housing 72, and thus allow for a downward clamping movement of shaft 97. Shaft 97 travels in bushings 99 and 100 as revealed in FIG. 5.

A cup shaped cap member 101 serves as a dust and safety shield, and is provided with a bottom portion 102 bearing on top of shaft 97 and a rim portion 103 extending downward to overlap the top of cylindrical housing 92 with a sliding clearance. A bolt 106 passes through aperture 104 in member 101, and fastens pivot arm 90 to shaft 97.

The pivot arm 90 is located on top of cap member 101 and extends radially beyond cap member 101 to permit clamping of a stator during operation. Clamping block 91 (and clamping block 89 for clamping means 18) is attached to pivot arm 90 by bolts 107.

The lower end of shaft 97 extends below plate 27 and is provided with means such as notches for locking engagement with a coupling 108 that in turn is connected to a first drive rod 109 (another drive rod 109 being for clamping means 18) for clamping means 19. As best shown in FIG. 6, drive rods 109 are connected at opposite ends of a cross member 119; and a piston rod 121 of a hydraulic cylinder 111 is attached to cross member 119. Cylinder 118 is operative to raise and lower cross member 119 and thus rods 109 and shafts 97.

Each shaft 97 has a gear 116 keyed to it, and these gears 116 are in meshing engagement with a gear 117 that is concentric with the support column 14. Any rotational movement of shaft 97 of clamping means 19 causes equal but oppositely directed movement of the shaft 97 of clamping means 18. Thus, as clamping means 19 is moved into place over a core (by handle 95), clamping means 18 also moves into place over the core due to the meshing relationship of gears 116 and 117.

Reviewing now briefly the sequence of operations at a work station where apparatus 11 is located; a stator core assembly 13 is placed on support column 14, with stator bore 17 encompassing outer surface 16 of support column 14 and bolt holes 87 aligned on alignment pins 81 (to ensure that stator slots 88 are aligned with wedge setting blades 48). Stator core assembly 13 and support column 14 are relatively moved until stator face 114 bears against the upper surface of legs 22. At this time, wedge setting blades 48 are in their retracted or withdrawn position.

Clamping means 18 and 19 are then moved into clamping position by moving handle 95 so as to move clamping blocks 91 and 89 over the upper face of the core. Hydraulic cylinder 111 (see FIG. 6) is next actuated to move in the direction of arrow 122 and force clamping blocks 89 and 91 against stator face 112. This clamping action continues until cylinder 111 is de-energized.

Hydraulic cylinder 61 then is energized to move in the direction of arrow 123 and force conical in shape portion 56 downwardly (as viewed in FIG. 5) in the direction of arrow 123 under the influence of piston rod 59. As conical in shape portion 56 moves down, its cam surface 57 moves the wedge setting blades 48 radially outwardly (as indicated by arrow 124) with wedge setting surfaces 69 forcing wedges and windings back away from bore 17 so as to establish the desired clearance with the bore 17 (as seen in FIG. 4.)

Substantially simultaneously with the wedge setting action just described, winding portions 12 are pressed from a first configuration 127 (see FIG. 2) to a desired configuration 128. As wedge setting blades 98 move outwardly, the cam areas 75 operatively interconnected therewith operate against cam surfaces 78 and force the end winding shaping means 73 to move upward in the direction of arrow 126 (see FIG. 5); forcing shaping face 79 to engage and press winding ends 12 to the desired configuration.

Thereafter, hydraulic cylinder 61 returns actuating means 47 to its original raised position and, as it moves, wedge setting blades 48 are biased by springs 51 and 52 to their original position. As blades 48 return home, cam surfaces 75 also move "home", and member 73 drops, by gravity, to its original position.

As actuating means 47 returns to its initial position, clamping means 18 and 19 are de-energized, and clamping blocks 89 and 91 may be manually pivoted out of the way of the stator core. Stator assembly 13 is then removed from the work station, and the apparatus of FIG. 1 is ready to receive another stator assembly.

It is to be noted that the annular member 73 may be manually lifted and removed from the remainder of the apparatus of FIGS. 1 and 5, when desired. For example, in the event that pressing of end turns is not desired for a particular motor model, the member 73 will be removed. The remainder of the apparatus may then be used in the same manner as known heretofore during wedge setting operations.

While the present invention has been described by reference to preferred modes of practicing the same, it is to be understood that modifications may be made by those skilled in the art without actually departing from the invention.

What I claim as new and desire to secure by Letters Patent of the United States is:

1. A method of setting at least one insulating wedge in a stator assembly by moving wedge setting means, including an elongate surface, radially relative to the stator assembly while the elongate surface is in engagement with the wedge, and thereby moving at least part of the wedge in a radial direction relative to an axially extending slot of a stator core; and substantially simultaneously therewith changing the shape of at least part of the end portions of a plurality of winding turns supported on the core by moving means for shaping end portions of winding turns while the means for shaping is in pressing engagement with such at least part of the end portions, the method comprising: positioning the stator assembly in predetermined relation to radially movable wedge setting means including the elongate surface at a first station; holding the stator assembly in fixed relation to the wedge setting means and, while so holding the stator assembly, generally concurrently setting the at least one wedge and shaping the at least a portion of the plurality of winding turns by moving the wedge setting means radially relative to the stator assembly while the wedge setting means is in camming and driving engagement with the means for shaping end portions and while the elongate surface is in engagement with the wedge, whereby radially moving the wedge setting means causes axial movement of the means for shaping end portions and associated shaping of winding turn end portions engaged thereby and also causes radial movement of the elongate surface and setting of a wedge engaged thereby; and thereafter moving the stator assembly away from the wedge setting means.

* * * * *